United States Patent
Peluso et al.

(10) Patent No.: US 11,588,214 B2
(45) Date of Patent: Feb. 21, 2023

(54) BATTERY STRAPS

(71) Applicant: CPS Technology Holdings LLC, New York, NY (US)

(72) Inventors: Fabio F. Peluso, Cedarburg, WI (US); Jeffrey L. Troxel, Menomonee Falls, WI (US); Dale B. Trester, Waukesha, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 16/481,382

(22) PCT Filed: Jan. 26, 2018

(86) PCT No.: PCT/US2018/015461
§ 371 (c)(1),
(2) Date: Jul. 26, 2019

(87) PCT Pub. No.: WO2018/140735
PCT Pub. Date: Aug. 2, 2018

(65) Prior Publication Data
US 2019/0393473 A1  Dec. 26, 2019

Related U.S. Application Data

(60) Provisional application No. 62/454,274, filed on Feb. 3, 2017, provisional application No. 62/451,578, filed on Jan. 27, 2017.

(51) Int. Cl.
*H01M 50/529* (2021.01)
*H01M 50/20* (2021.01)
(Continued)

(52) U.S. Cl.
CPC ....... *H01M 50/529* (2021.01); *H01M 50/112* (2021.01); *H01M 50/20* (2021.01); *H01M 50/502* (2021.01)

(58) Field of Classification Search
CPC .. H01M 50/529; H01M 50/502; H01M 50/20; H01M 50/112; H01M 50/54; Y02E 60/10
See application file for complete search history.

(56) References Cited

U.S. PATENT DOCUMENTS 2,203,797 A    8/1940  Pearson
3,253,962 A *  5/1966  Deprill ............... H01M 50/529
                                                    429/160
(Continued)

FOREIGN PATENT DOCUMENTS

CN    2614389 Y    5/2004
CN    103035975 A  4/2013
(Continued)

OTHER PUBLICATIONS

International Preliminary Report on Patentability dated Jan. 13, 2011 for International Application No. PCT/US2009/049231 filed Jun. 30, 2009.
(Continued)

*Primary Examiner* — Matthew T Martin
*Assistant Examiner* — Adam J Francis
(74) *Attorney, Agent, or Firm* — Boardman & Clark LLP

(57) ABSTRACT

A battery and straps for a battery are disclosed. The battery according to various embodiments comprises a number of straps which connect a number of battery cells in series. The battery straps may pass through cutouts provided in a cell divider wall. The cutouts and straps may define a common headspace. The battery may have five connecting straps and two end straps.

13 Claims, 9 Drawing Sheets

(51) Int. Cl.
*H01M 50/112* (2021.01)
*H01M 50/502* (2021.01)

(56) References Cited

U.S. PATENT DOCUMENTS

| | | | |
|---|---|---|---|
| 3,546,023 A | 12/1970 | Halter et al. | |
| 4,169,192 A | 9/1979 | Clague et al. | |
| 4,327,890 A | 5/1982 | Cattano | |
| 4,347,294 A | 8/1982 | Mejia | |
| 4,376,156 A | 3/1983 | Wheadon | |
| 4,383,011 A | 5/1983 | McClelland | |
| 4,399,607 A | 8/1983 | May | |
| 4,504,556 A | 3/1985 | Pearson | |
| 4,521,498 A | 6/1985 | Juergens | |
| 4,573,514 A | 3/1986 | Wolf et al. | |
| 4,780,379 A | 10/1988 | Puester | |
| 4,800,142 A | 1/1989 | Bish et al. | |
| 5,206,987 A | 5/1993 | Mix | |
| 5,283,137 A | 2/1994 | Ching | |
| 5,510,203 A | 4/1996 | Hamada et al. | |
| 5,580,677 A | 12/1996 | Morishita et al. | |
| 5,686,202 A | 11/1997 | Hooke et al. | |
| 5,836,371 A | 11/1998 | Kump et al. | |
| RE36,102 E | 2/1999 | Dougherty | |
| 3,023,146 A | 2/2000 | Casale et al. | |
| 6,033,800 A | 3/2000 | Ichiyanagi et al. | |
| 6,468,318 B1* | 10/2002 | Meadows | H01M 50/529 29/623.1 |
| 6,524,747 B2 | 2/2003 | Holden et al. | |
| 6,635,380 B1 | 10/2003 | Shimoda et al. | |
| 6,761,992 B1 | 7/2004 | Marukawa et al. | |
| 6,864,013 B2 | 3/2005 | Gow et al. | |
| 7,037,620 B2 | 5/2006 | Aronsson | |
| 7,045,236 B1 | 5/2006 | Andrew et al. | |
| 7,547,487 B1 | 6/2009 | Smith et al. | |
| 8,729,851 B2 | 5/2014 | Bobbin et al. | |
| 8,822,063 B2 | 9/2014 | Oldenburg et al. | |
| 8,980,419 B2 | 3/2015 | Kao et al. | |
| 9,093,689 B2 | 7/2015 | Mack | |
| 2002/0061434 A1* | 5/2002 | Holden | H01M 10/0463 429/54 |
| 2002/0098412 A1 | 7/2002 | Rodriguez et al. | |
| 2002/0177035 A1 | 11/2002 | Oweis et al. | |
| 2003/0077508 A1* | 4/2003 | Asahina | H01M 50/529 429/153 |
| 2004/0247995 A1 | 12/2004 | Devitt | |
| 2011/0143188 A1* | 6/2011 | Mack | H01M 50/20 429/159 |
| 2013/0089775 A1* | 4/2013 | Mack | H01M 50/114 429/185 |
| 2013/0202926 A1 | 8/2013 | Yoon | |
| 2015/0079427 A1 | 3/2015 | Chen et al. | |
| 2016/0380243 A1 | 12/2016 | Kim | |

FOREIGN PATENT DOCUMENTS

| | | |
|---|---|---|
| CN | 104078627 A | 10/2014 |
| CN | 105229820 A | 1/2016 |
| JP | 2000067843 A | 3/2000 |
| JP | 2005011602 | 1/2001 |
| JP | 2004031062 | 1/2004 |
| JP | 2004178831 | 6/2004 |
| JP | 2004265830 | 9/2004 |
| WO | 1999036972 A1 | 7/1999 |
| WO | 2007111600 | 10/2007 |
| WO | 2008066253 A1 | 6/2008 |
| WO | 2010002874 | 1/2010 |

OTHER PUBLICATIONS

International Search Report and Written Opinion dated Aug. 14, 2009 for International Application No. PCT/US2009/049231 filed Jun. 30, 2009.

Supplemental European Search Report of the European Patent Office dated Mar. 11, 2013 for EP 090774325.

International Search Report and Written Opinion dated Mar. 26, 2018 for International Appln. No. PCT/US2018/015461 filed Jan. 26, 2018.

International Preliminary Report on Patentability dated Jul. 30, 2019 for International Appln. No. PCT/US2018/015461 filed Jan. 26, 2018.

"Electric Vehicle Structure, Principle and Maintenance (First Edition)", by Xingmin Wu, et al., Beijing Institute of Technology Press, Jul. 31, 2015, pp. 43.

* cited by examiner

BATTERY STRAPS

PRIORITY CLAIM

This application is a National Stage Entry of PCT/US18/15461, filed Jan. 26, 2018, which claims priority to U.S. Provisional Applications Nos. 62/451,578 filed Jan. 27, 2017, and 62/454,274 filed Feb. 3, 2017, the entireties of which are incorporated by reference herein.

FIELD OF INVENTION

The present disclosure relates to batteries. The present disclosure more specifically relates to batteries and internal electrical connections in batteries.

BACKGROUND

It is known to provide for a battery having one or more battery cell elements in a flat-plate format that may be used for deep cycle, SLI (Starting, Lighting, Ignition) or other applications. Such known batteries typically include a variety of shapes and configurations. In batteries with multiple cell elements, the cells are connected in series by conductive straps. These conductive straps comprise conductive material, which typically requires substantial additional material costs and weight. However, such known batteries do not realize certain advantageous features and/or combinations of features.

SUMMARY

Therefore, the disclosed battery straps connect a number of battery elements in series. The disclosed straps may advantageously allow for the connection of multiple battery cells with a reduction in material, and therefore material costs and weight, relative to known batteries. In addition, the disclosed straps may allow for improved conductivity relative to known batteries. Also, the disclosed straps may allow for improved circulation of gasses in a battery.

The present invention according to various embodiments relates to a battery comprising six battery cells wherein the cells are electrically coupled in series by five straps which pass through recesses in a cell divider.

The present disclosure relates to a battery according to various embodiments having a housing having at least two cells and a cell wall provided between the two cells, a plurality of elements provided within the cells, a battery strap cast onto two of the elements and directly connecting two of the elements in series through the cell walls, a common headspace defined by the cell wall, wherein the battery strap has a top surface with a front edge, a first side edge, a second side edge, and a back edge, the first side edge and the second side edge being parallel to each other and perpendicular to the front edge and the back edge. The present disclosure further relates to a battery wherein the cell wall features a cutout and the battery strap connects two elements through the cutout. The present disclosure further relates to a battery wherein the battery straps comprise a first, second, third, fourth, and fifth connecting strap. The present disclosure further relates to a battery wherein the first, second, and third connecting strap are provided in a first row and the fourth and fifth connecting straps are provided in a second row opposite the first row. The present disclosure further relates to a battery wherein the second row further comprises two end straps. The present disclosure further relates to a battery wherein the cutout has a cutout width and the straps have a strap width and the cutout width is larger than the strap width. The present disclosure further relates to a battery wherein the cutout has a cutout height and the straps have a strap height and the cutout height is larger than the strap height.

The present disclosure according to various embodiments further relates to a battery having: a housing having cells and cell walls, the cell walls each having a cutout; a plurality of battery elements provided within the cells; a plurality of battery straps connecting the plurality of battery elements in series, each battery strap extending through a cell wall through a cutout; a common headspace defined by the cutout; wherein the battery strap has a top surface with a front edge, a first side edge, a second side edge, and a back edge, the first side edge and the second side edge being parallel to each other and perpendicular to the front edge and the back edge. The present disclosure further relates to a battery wherein the cutout has a cutout width and the straps have a strap width and the cutout width is larger than the strap width. The present disclosure further relates to a battery wherein the cutout has a cutout height and the straps have a strap height and the cutout height is larger than the strap height. The present disclosure further relates to a battery wherein the battery straps comprise five connecting straps and two end straps. The present disclosure further relates to a battery, wherein the battery straps comprise a first row having three connecting straps and a second row comprising two connecting straps and two end straps.

The present disclosure relates to a battery according to various embodiments comprising: six cells, each cell being divided by a cell wall; seven straps, the straps being arranged in two rows, a first row having a first connecting strap, a second connecting strap, and a third connecting strap; a second row having a fourth connecting strap and a fifth connecting strap; the second row further comprising a first end strap and a second end strap; the first, second, third, fourth, and fifth connecting straps directly connecting the six cells in series through the cell wall.

The present disclosure further relates to a battery wherein the cells are separated by five cell walls, each cell wall having a cutout. The present disclosure further relates to a battery, wherein each connecting strap passes through the cutout to connect adjacent battery elements. The present disclosure further relates to a battery, wherein each cutout has a cutout height which is larger than a connecting strap height. The present disclosure further relates to a battery wherein each cutout has a cutout width which is larger than a connecting strap width.

These and other features and advantages of various embodiments of systems and methods according to this invention are described in, or are apparent from, the following detailed description of various exemplary embodiments of various devices, structures, and/or methods according to this invention.

It should be understood that the drawings are not necessarily to scale. In certain instances, details that are not necessary to the understanding to the invention or render other details difficult to perceive may have been omitted. It should be understood, of course, that the invention is not necessarily limited to the particular embodiments illustrated herein.

DETAILED DESCRIPTION

The battery straps 123, according to various embodiments, connect a number of battery cells 107, for example, six battery cells, in series. The battery straps 123 may be, according to various examples of embodiments, direct path cast-on straps. The battery cells 107 may be comprised of flat-plate grids stacked together. The grids may have a lug extending out of the top of the grid. The straps 123 may be understood to connect the lugs of the grids in the cell 107 together.

Figure 1:
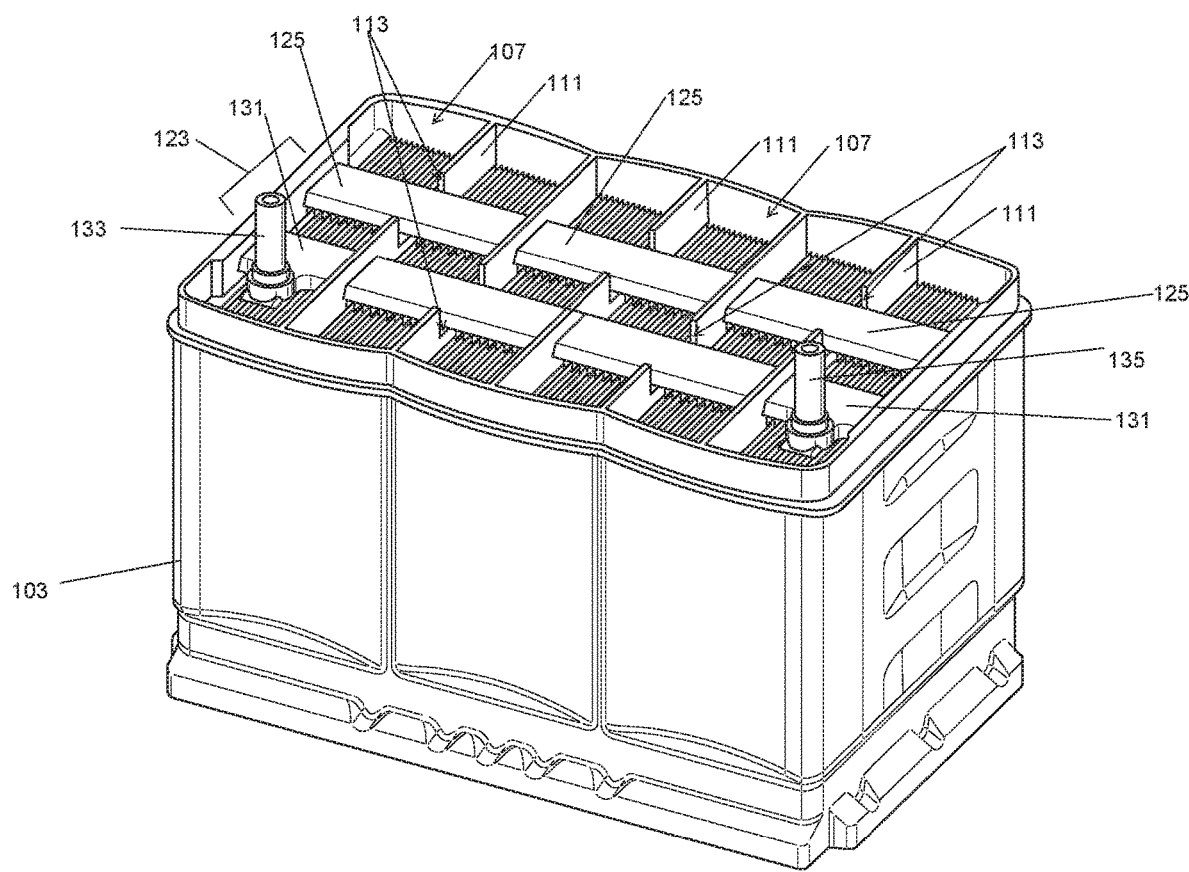
FIG. 1 shows a side angle view of a battery having battery straps, according to various examples of embodiments.

FIG. 1 shows an isometric view of a battery 101 having the battery straps 123 or conductive straps, according to various examples of embodiments. The battery straps 123 may comprise connecting straps 125 and end straps 131. The battery 101 may be seen to comprise a number of flat-plate grids stacked together and provided within a number of cells 107.

The battery 101 includes a battery housing 103. The battery straps 123 disclosed herein according to various embodiments may be "cast-on straps." The straps may be "cast on" in that they are cast onto the lugs of the battery element lugs. Five connecting straps 125 are shown in FIG. 1 as coupling six battery elements in series. A positive terminal and a negative terminal (first terminal 133, second terminal 135) integrated into end straps 131 are shown on one side of the battery in the illustrated example. The connecting straps 125 are shown in FIG. 1 in parallel planes passing through cutouts 113 provided in the battery cell walls 111 to connect adjacent cell elements in series. The connecting straps 125 can be seen, in various embodiments, as having a thickness such that the cell wall 111 is taller than the connecting strap 125. In particular, the connecting straps 125 may have a height 127 that is shorter than a height 115 of a cutout 113. In addition, the connecting straps 125 may have a width 117 that is smaller than a cutout width 117.

The connecting straps 125 can be seen, in various embodiments, connecting the lugs of a first polarity of battery plates of a battery element 109 to the lugs of the battery plates of an opposite polarity of a second battery element 109. A terminal 135 connected to an end strap 131 having a polarity (e.g. a positive terminal) which connects the lugs of plates of the same polarity (e.g. positive) of a battery element 109 can be seen in FIG. 1 as provided in a lower right-hand corner of the battery 101, according to various examples of embodiments. Similarly, another terminal 133 (e.g. a negative terminal) connected to an end strap 131 which connects the lugs of plates (e.g. negative plates) of a battery element 107 can be seen in FIG. 1 as provided in a lower left-hand corner of the battery 101, according to various examples of embodiments.

Figure 2:
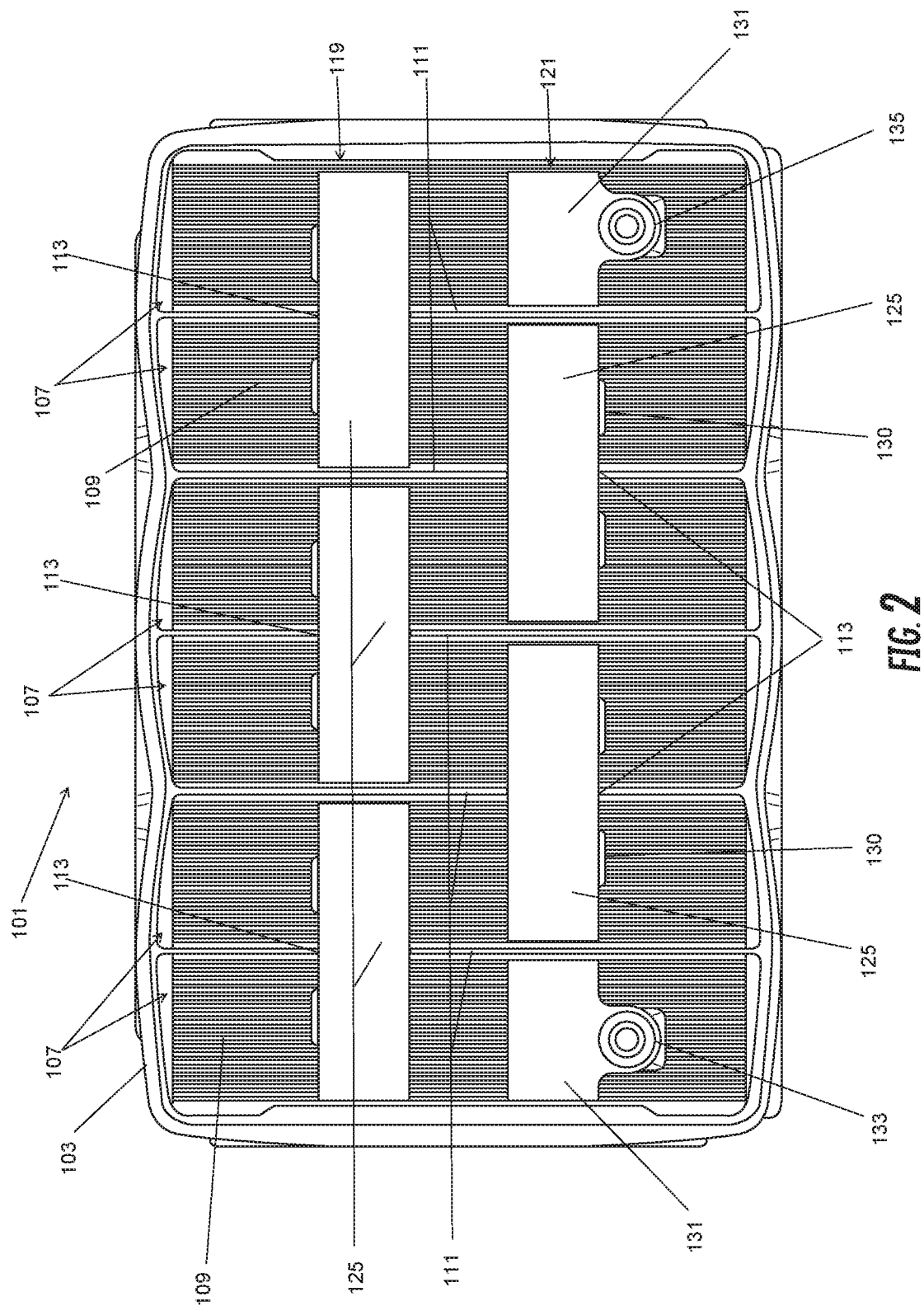
FIG. 2 shows a top side view of a battery having battery straps, according to various examples of embodiments.

FIG. 2 shows a top side view of a battery 101 having straps 123 (e.g. cast-on straps), according to various examples of embodiments. A first row 119 and second row 121 of battery straps 123 are shown. The first row 119 may be seen relative to the top of FIG. 2, while the second row 121 may be seen below the first row 119 in FIG. 2. The first row 119 comprises, in various embodiments, three connecting straps 125. The second row 121, which has a first battery terminal 131 and end strap 131 as well as a second battery terminal 135 and end strap 131, has two connecting straps 125 positioned parallel to the three connecting straps 125 in the first row 119. While a specific configuration is illustrated and described, variations thereon may also be acceptable. For example, the positive and negative terminals may be on the first row or second row or both (e.g., one on each). The straps can be understood to be cast onto the positive or negative lugs provided within each battery element which is offset from the other elements by a separating cell wall 111.

As can be seen in FIG. 2, a cutout 113 or recess may be provided for the connecting strap 125 which can be found in a single location along each battery cell wall 111. The cutout 113 may be seen, in various embodiments, as suitably positioned relative to the location of the lugs of the elements 109 and connecting straps 125 attached thereto. The positioning of the connecting straps 125 and cutouts 113 can be seen in FIG. 2 as forming an alternating pattern. While a single cutout or recess is specifically disclosed, more than one cutout is also contemplated. In various embodiments, it should be understood the connecting straps 125 are cast through the cutout 113 or hole in the wall. The battery straps 125 may be sized to be smaller than the cutout 113 or recess in the cell wall. This may advantageously allow for further open space (i.e. common headspace 137) in the battery 101 cavity.

Figure 3:
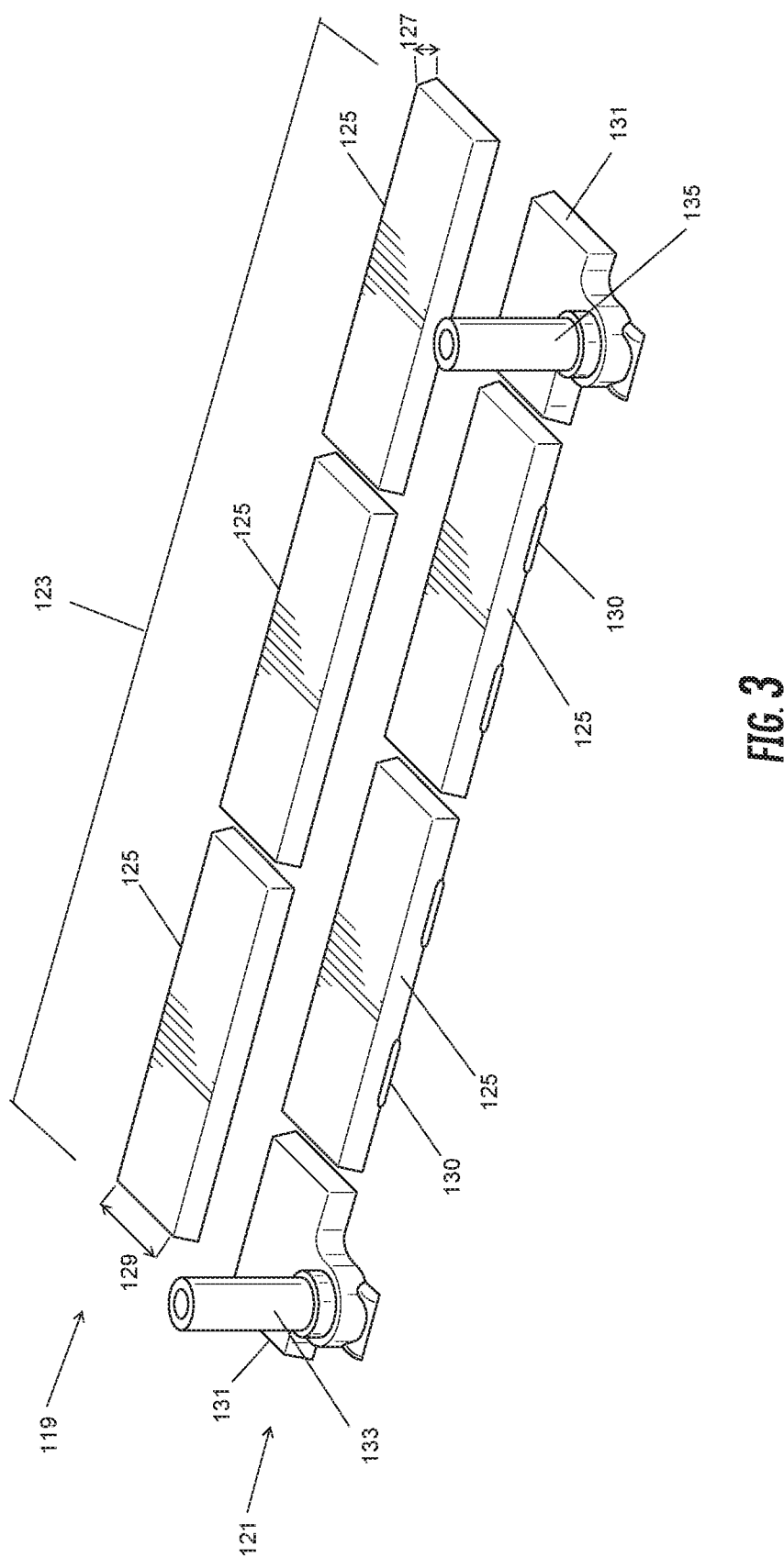
FIG. 3 shows battery straps, according to various examples of embodiments.

FIG. 3 shows battery straps 123, according to various embodiments, outside of the battery or battery housing. Five of the connecting straps 125 can be seen to be approximately equal in shape. Similarly, the end straps with the terminals may be approximately equally shaped. The connecting straps 125, in various embodiments, may be substantially rectangular shaped when viewed from above. The connecting straps 125 may be, in various embodiments, substantially a rectangular prism shape. The battery straps 123 may widen from a top surface towards a bottom surface. In various embodiments, the connecting straps 125 may have two projections 130 on the side of the cast-on strap.

Figure 4:
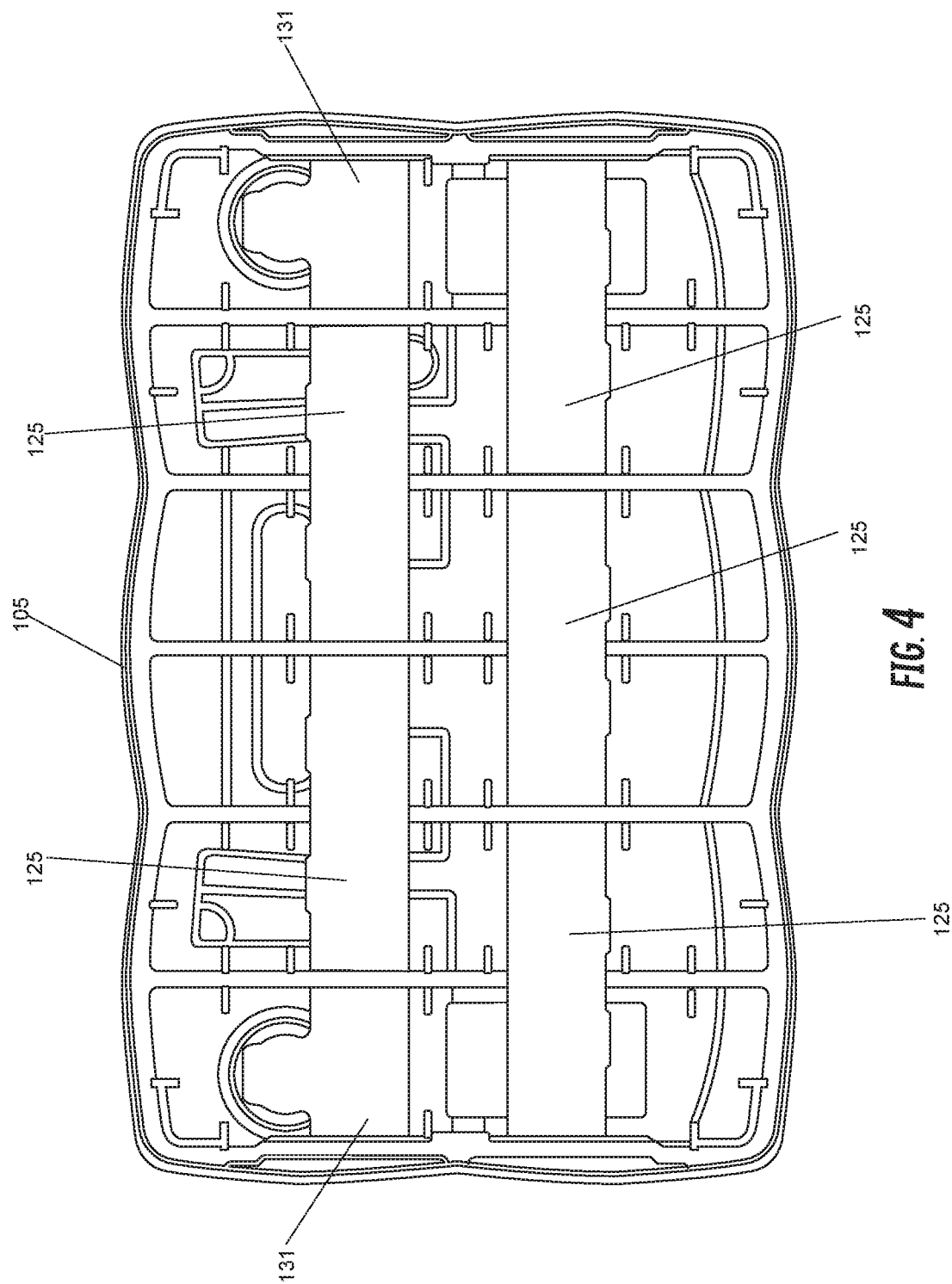
FIG. 4 shows a battery cover having battery straps, according to various examples of embodiments.

It should be understood the battery 101 may also include a battery cover 105 provided on the housing 103. FIG. 4 shows a battery cover 105 positioned relative to the battery straps 123, according to various examples of embodiments. The cover 105, in various embodiments, may be sized to accept the straps 123 and terminals 133, 135. The cover 105 may likewise include element separators, sized to accommodate the straps 123 disclosed herein. In addition, the cover 105 may be sized to accept the terminals 133, 135 provided on opposite ends of the battery straps, in various embodiments, on one side. In various exemplary embodiments, a first terminal post (positive) and second terminal post (negative) may be positioned in areas substantially near the intersections of either the front edge or back edge (both of the terminals may be near the same edge) with the first end and second end.

Figure 5:
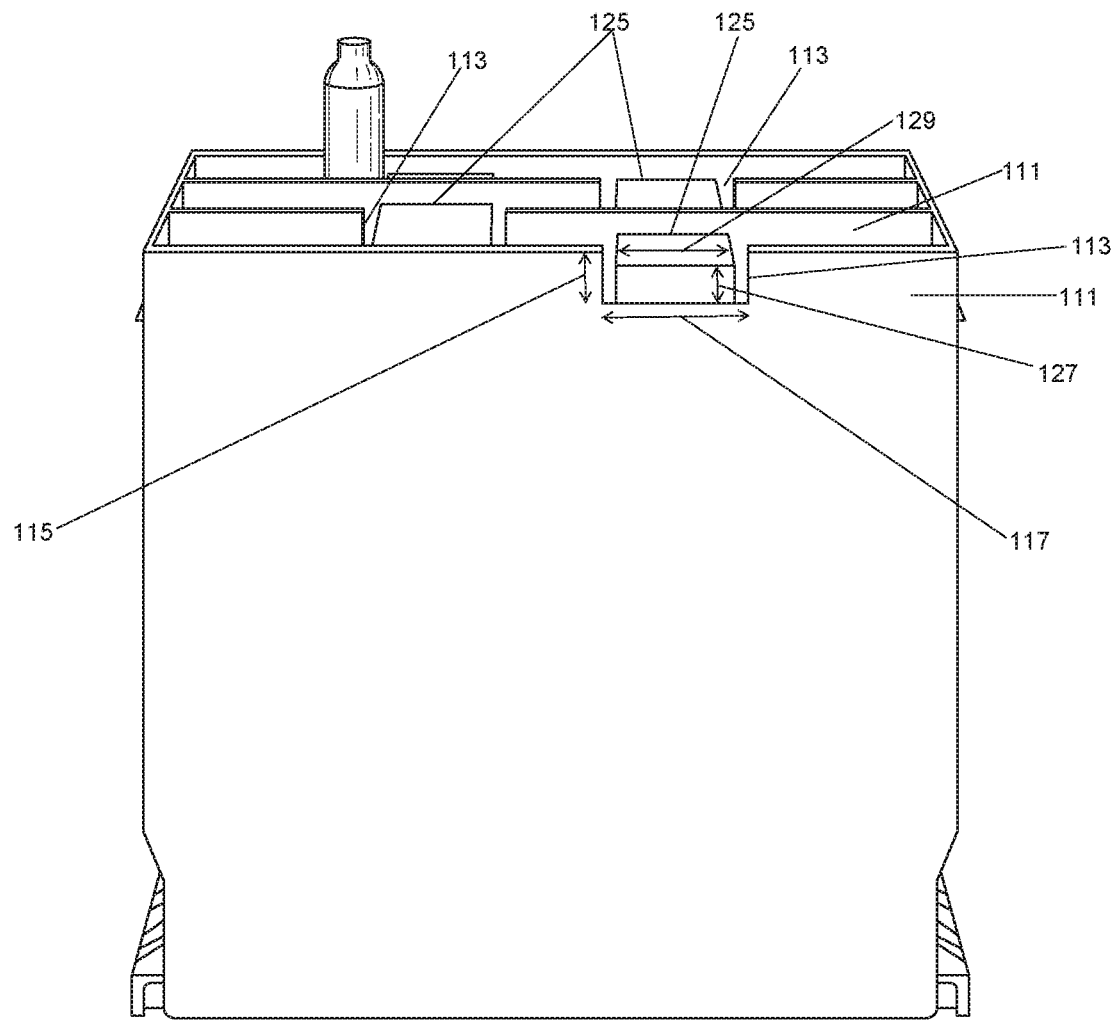
FIG. 5 shows a cut-away view of a battery having battery straps, according to various examples of embodiments.

FIG. 5 shows a side view of the straps 123 (e.g. cast on straps) with cell walls 111 having a cutout 113, according to various examples of embodiments. A space can be seen on either side of the connecting strap 125 in the cutout (i.e. the strap width 129 may be smaller than a cutout width 117), according to various examples of embodiments. In addition, the strap may be sized to allow a space (or headspace 137) above the strap, that is, the height 115 of a cutout, in various embodiments, may be smaller than a height 127 of a connecting strap 125.

Figure 6:
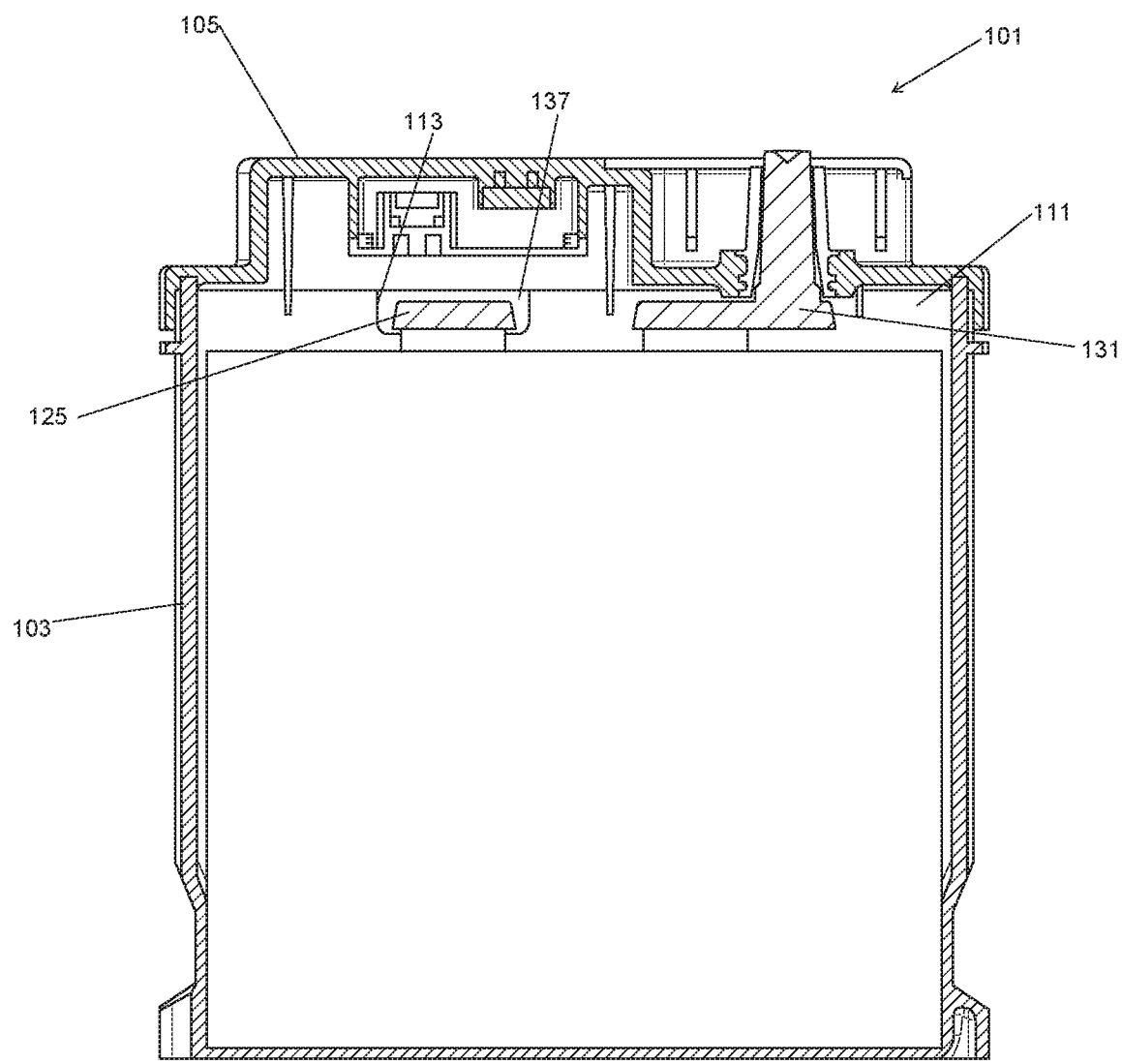
FIG. 6 shows a cut-away view of a battery having battery straps, according to various examples of embodiments.

FIG. 6 shows a side cut-away view of a battery having the cast-on straps (straps 123), according to various examples of embodiments. A connecting strap 125 may be seen on the lug of a plate on a left-hand side of the cut-away battery 101 of FIG. 6. In various embodiments, a terminal post and end strap 131 may be seen, the terminal post protruding through the battery cover 105. A common headspace 137 may be seen created between the sides of the connecting strap 125 in the cutout 113 and the battery cover 105, according to various examples of embodiments. FIG. 6, according to various embodiments of the invention, shows one cell wall 111 having a recess with a connecting strap, or cast-on strap, provided through the recess to connect adjacent cell elements, creating an open space or headspace 137 between the strap 125 and the cover 105. The headspace 137 shown in FIG. 6 should be understood to lead to a common headspace 137 within the battery 101, according to various embodiments.

The common headspace may be created, according to various examples of embodiments, by sizing the connecting 125 (cast-on) straps smaller than a recessed portion or cutout 113 of the cell dividing wall 111. Therefore, in various embodiments, a path of open headspace 137 is created between the cells and creates a common space between the housing 103 and cover 105.

The common headspace 137 may allow for certain advantages to the function and longevity of the battery. For example, common headspace 137 may allow for gasses to more easily be vented from the battery. While common headspace 137 is shown on one cell as an example, it should be understood to, in various embodiments, occur at each cell wall 111. The common headspace 137 may be defined by the cutout 113, as well as the cover 105. The connecting strap 125 may be smaller in strap width 129 and connecting strap height 127 than a cutout width 117 or cutout height 115. This allows for a space around the strap 125.

Figure 7:
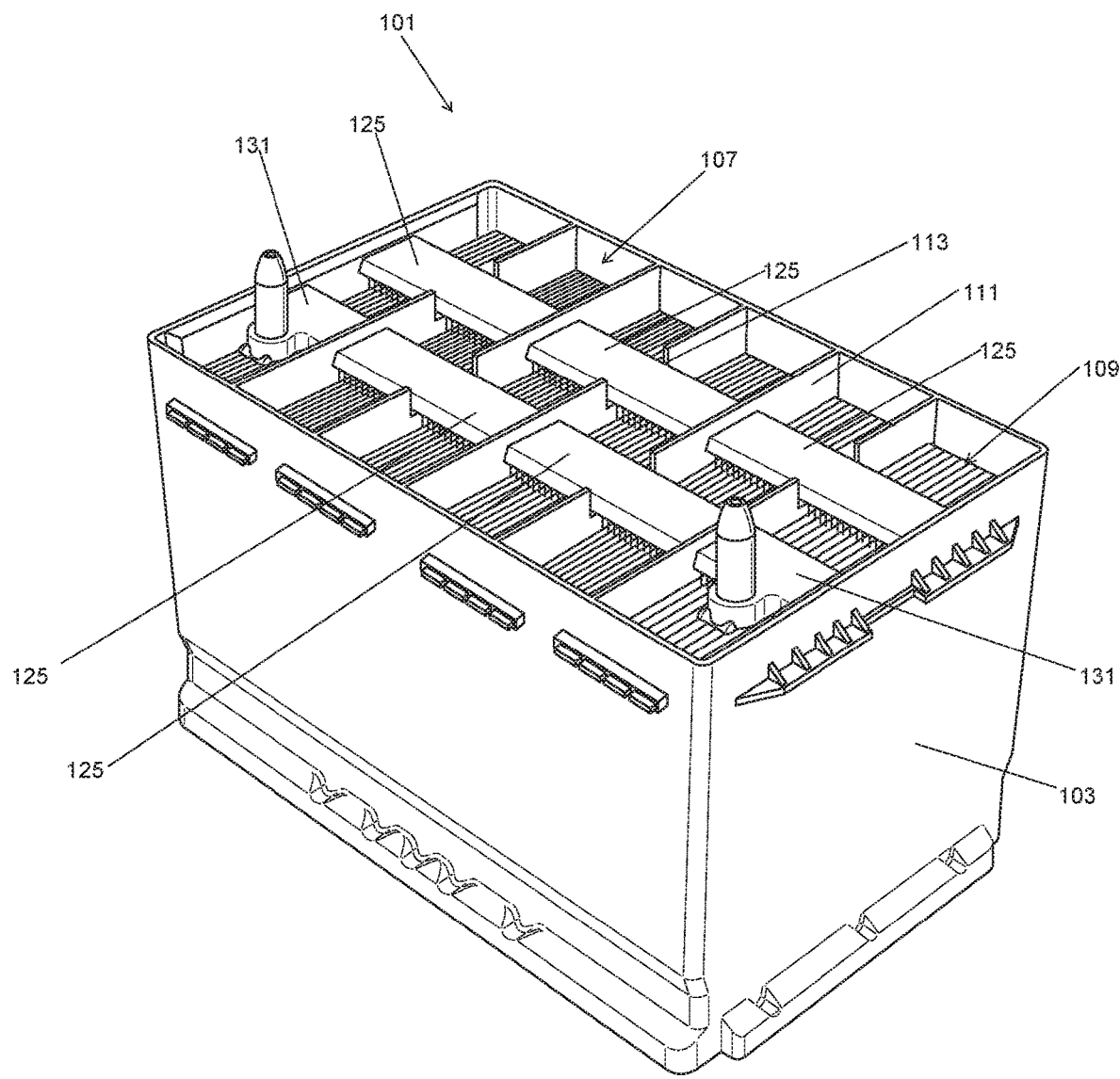
FIG. 7 shows a side-angle view of a battery having battery straps, according to various examples of embodiments.

FIG. 7 likewise shows an isometric view of a battery 101 having the battery straps 123 or conductive straps, according to various examples of embodiments. The battery includes a battery housing 103. The straps may be "cast on" in that they are cast onto the lugs of the battery element lugs. Five connecting straps 125 are shown in FIG. 7 as coupling six battery elements 109 in series. A positive terminal and a negative terminal integrated into end straps 131 are shown on one side of the battery 101 in the illustrated example. The connecting straps 125 are shown in FIG. 7 in parallel planes passing through recesses (cutouts 113) provided in the battery cell walls 111 to connect adjacent cell elements in series. Again, the straps can be seen, in various embodiments, as having a thickness or strap height 127 such that the cell wall 111 and cutout 113 is taller than the strap and the cutout height 115 is larger than the strap height 127. In addition, the cutout 113 can be seen as having a larger cutout width 117 than the strap width 129. The straps 123 can be seen, in various embodiments, connecting the lugs of the negative battery plates of a first battery element to the lugs of the positive battery plates of a second battery element.

Figure 8:
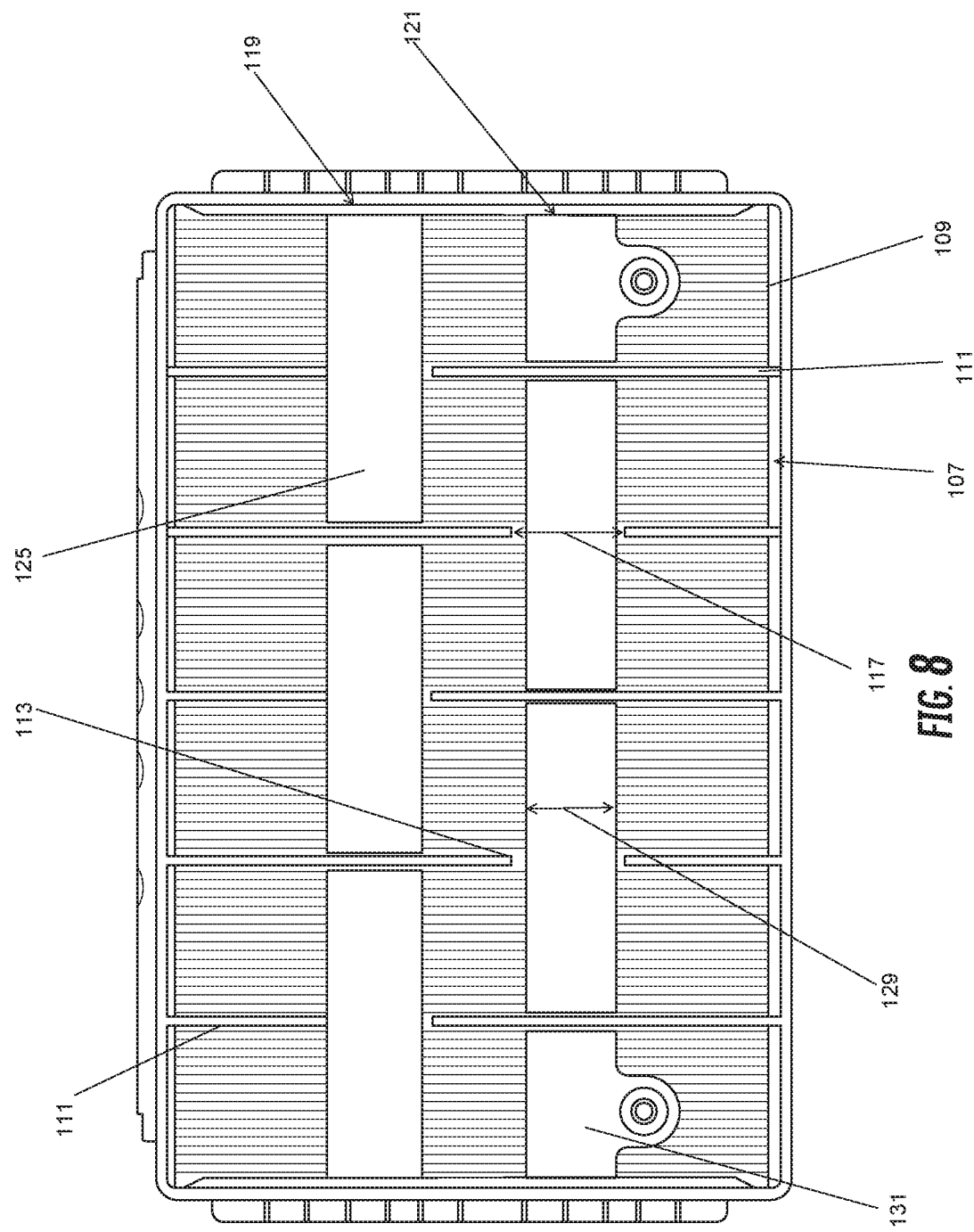
FIG. 8 shows a top side view of a battery having battery straps, according to various examples of embodiments.

As can be seen in FIG. 8, a cutout 113 or recess may be provided for the battery strap 125 which can be found in a single location along each battery cell wall 111. The cutout position may be seen, in various embodiments, as suitably positioned relative to the location of the lugs and connecting straps 125. The positioning of the straps and cutouts can be seen as forming an alternating pattern. While a single cutout or recess is specifically disclosed, more than one cutout is also contemplated. In various embodiments, it should be understood the straps are cast through the cutout or hole in the wall. The battery straps may be sized to be smaller than the cutout or recess in the cell wall (i.e. connecting strap width 129 may be smaller than cutout width 117). This may advantageously allow for further open space in the battery cavity.

Figure 9:
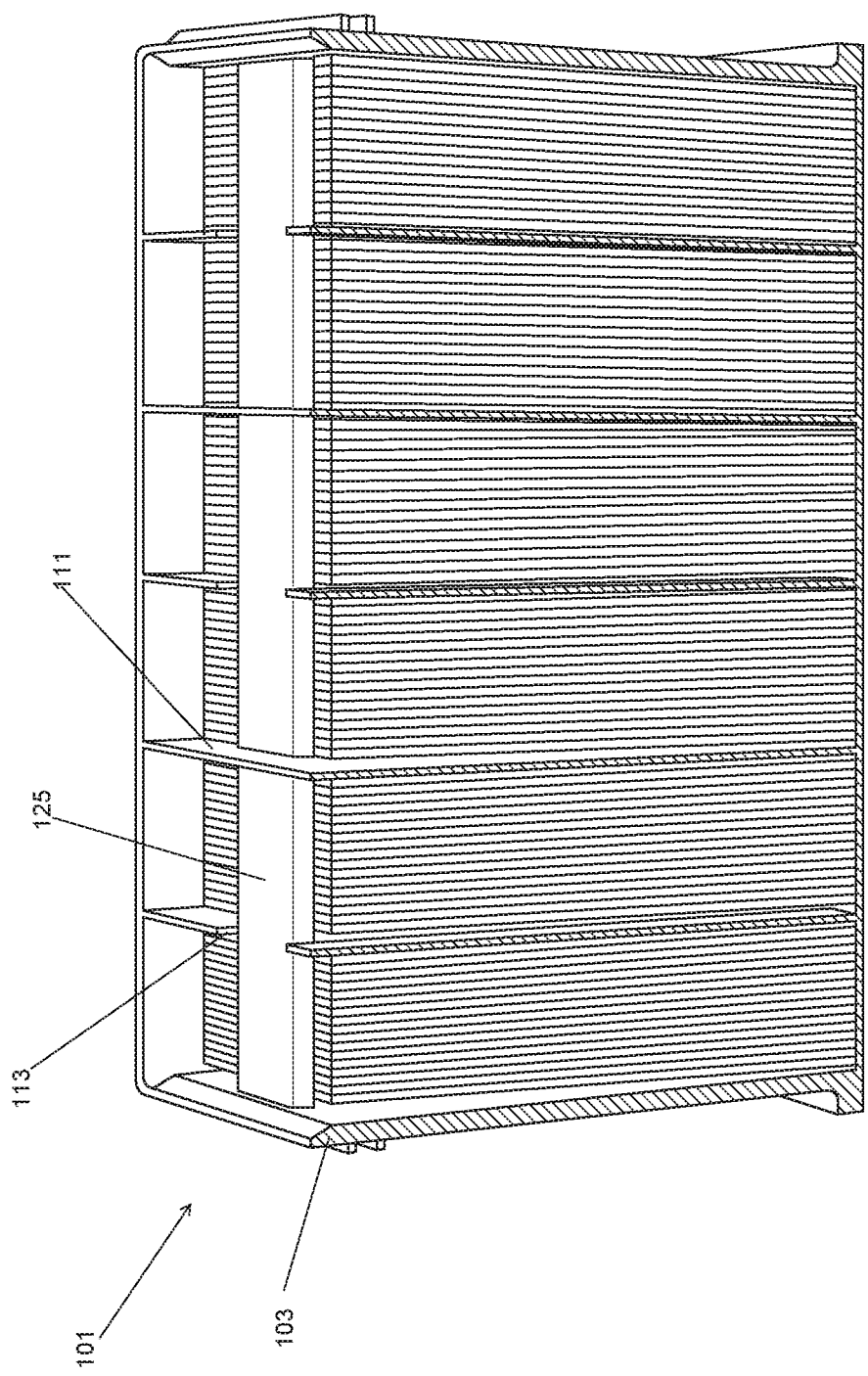
FIG. 9 shows a side cut-away view of a battery having battery straps, according to various examples of embodiments.

FIG. 9 shows a side view of the connecting straps 125 provided in a battery 101, according to various examples of embodiments. Again, the cutout 113 can be seen to be sized larger in various dimensions than the connecting strap 125, according to various examples of embodiments.

The various elements of the battery, the battery housing, the battery cover, and the cell containers may be made of a wide variety of materials as is well known in the art. For example, the cover, container, and/or various components may be made of any polymeric (e.g., polyethylene, polypropylene, a polypropylene containing material, etc.) or composite (e.g., glass-reinforced polymer) material. For example, the container may be made of polypropylene-containing material (e.g., pure polypropylene, co-polymers comprising polypropylene, polypropylene with additives, etc.). Such polymeric material is relatively resistant to degradation caused by acid (e.g., sulfuric acid) provided within cells of the container. The terminal posts, side terminals and connection members may be made of one or more conductive materials (e.g., lead or a material containing lead). Likewise, the strap members and end straps may be made of one or more conductive materials (e.g., lead or a material containing lead).

The strap members may be comprised, in various embodiments, of a lead alloy. In various embodiments, this alloy may be a substantially pure lead and may, in various embodiments, include lead, tin, antimony, calcium, and combinations thereof. The alloy may, as a non-limiting example, be a lead tin alloy with a tin composition range of 1-4%, 1-2.25%, 1-1.5%, and the like. The lead may be virgin lead or high purity lead or highly purified secondary lead, in various examples of embodiments.

The battery straps may be cast directly onto the cell elements. The battery straps may therefore couple together lugs of battery plates, the collection of battery plates coupled together forming a cell element, which is comprised of positive plates and negative plates. Separators may be provided between the positive plates and negative plates. The straps may connect the positive plates together or the negative plates together, as described above. The straps may have an elongate body form to suitably couple adjacent cell elements together through the recesses provided in the cell walls.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A battery having:
   a cover;
   a housing defining cells aligned in a single row, each cell divided by a cell wall having a respective cutout;
   a plurality of battery elements provided within the cells;
   two rows of battery straps connecting the plurality of battery elements in series, each connecting battery strap of the two rows extending through a respective cell wall of the cell walls through the respective cutout;
   a vapor communicative common headspace above a surface of the cells, the vapor communicative common headspace defined by paths of open headspace proximate each respective battery strap and further defined by the cover; and
   wherein each battery strap has a cross section that includes a substantially rectangular prism shape and is configured to taper from a bottom surface to a top surface of the strap.

2. The battery of claim 1, wherein each cutout has a cutout width and each strap has a strap width and the cutout width is larger than the strap width.

3. The battery of claim 1, wherein each cutout has a cutout height and each strap has have a strap height and the cutout height is larger than the strap height.

4. The battery of claim 1, wherein the battery straps comprise five connecting straps.

5. The battery of claim 1, wherein the battery straps comprise a first row having three connecting straps and a second row comprising two connecting straps.

6. A battery comprising:
   a housing defining six cells aligned in a single row and having five cell walls separating the six cells, each cell wall having a cutout;
   a first row of battery straps arranged above a surface of the single row of cells, the first row having a first connecting strap, a second connecting strap, and a third connecting strap;
   a second row of battery straps arranged above the surface of the single row of cells, the second row having a fourth connecting strap and a fifth connecting strap;
   the second row further comprising a first end strap and a second end strap;
   the first, second, third, fourth, and fifth connecting straps directly connecting the six cells in series through the cell walls;
   a vapor communicative common headspace for the six cells, the vapor communicative common headspace including a plurality of open spaces defined by the cutout and the connecting straps; and
   wherein each connecting strap has a cross section that includes a substantially rectangular prism shape configured to taper from a bottom surface to a top surface of said strap.

7. The battery of claim 6, wherein each connecting strap has a top surface with a front edge, a first side edge, a second side edge, and a back edge, the first side edge and the second side edge being parallel to each other and perpendicular to the front edge and the back edge.

8. The battery of claim 6, wherein each connecting strap passes through a respective cutout to connect adjacent battery elements.

9. The battery of claim 6, wherein each cutout has a cutout height which is larger than a connecting strap height.

10. The battery of claim 6, wherein each cutout has a cutout width which is larger than a connecting strap width.

11. The battery of claim 1, wherein each battery strap has a top surface with a front edge, a first side edge, a second side edge, and a back edge, the first side edge and the second side edge being parallel to each other and perpendicular to the front edge and the back edge.

12. The battery of claim 11, wherein the top surface of each battery strap is continuous along the front edge and the first side edge.

13. The battery of claim 7, wherein the top surface of each connecting strap is continuous along the front edge and the first side edge.

\* \* \* \* \*